H. W. RHOADS.
ROTARY EXPLOSION ENGINE.
APPLICATION FILED JULY 2, 1914.
1,186,332.
Patented June 6, 1916.
4 SHEETS—SHEET 3.
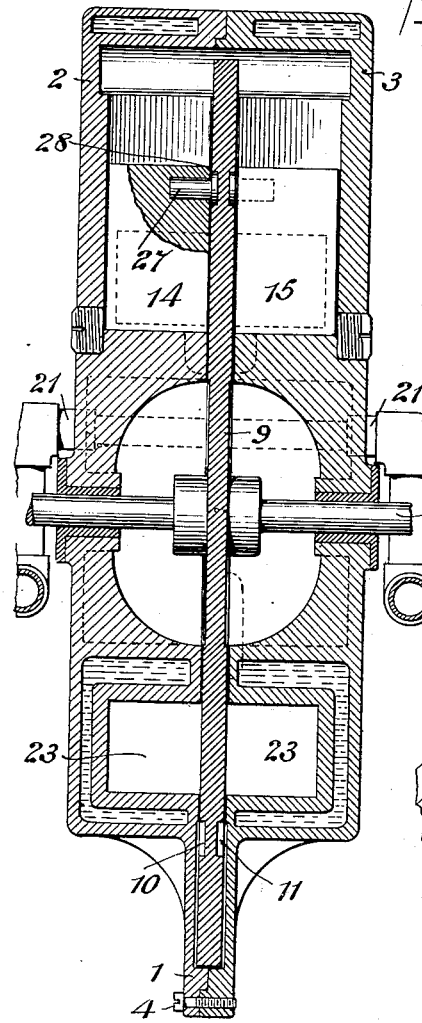
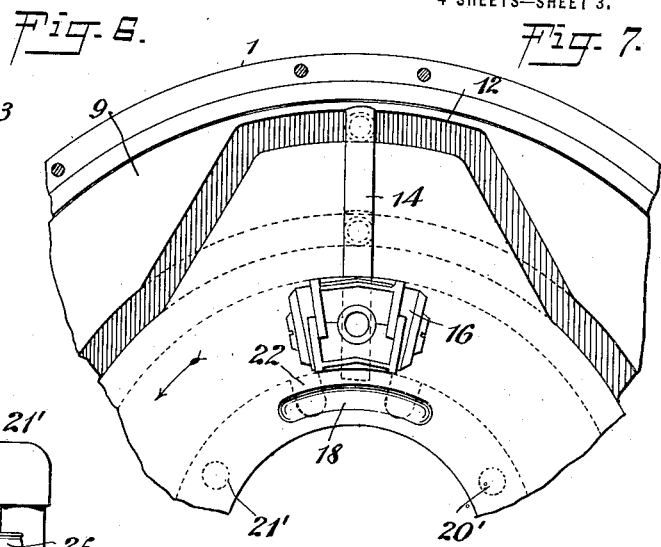
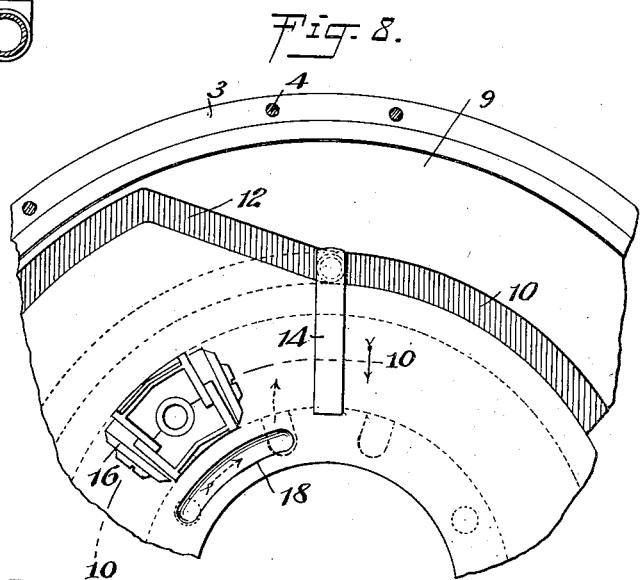
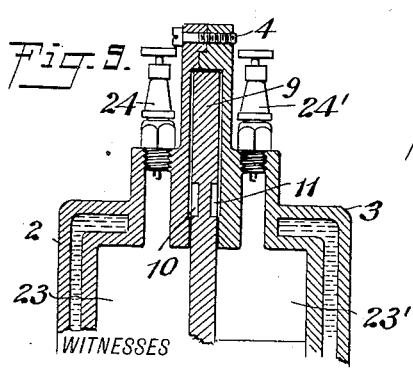
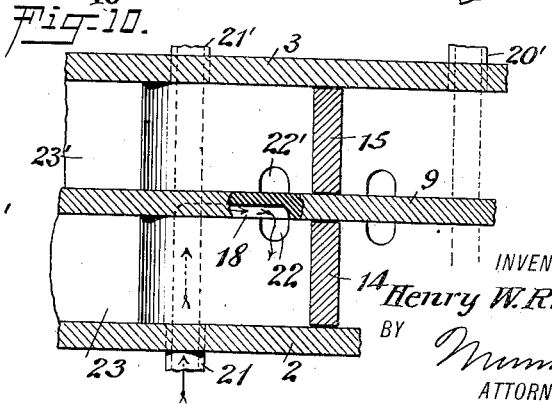
WITNESSES
William P. Goebel.
A. L. Kitchin.
INVENTOR
Henry W. Rhoads
BY
Munn & Co
ATTORNEYS

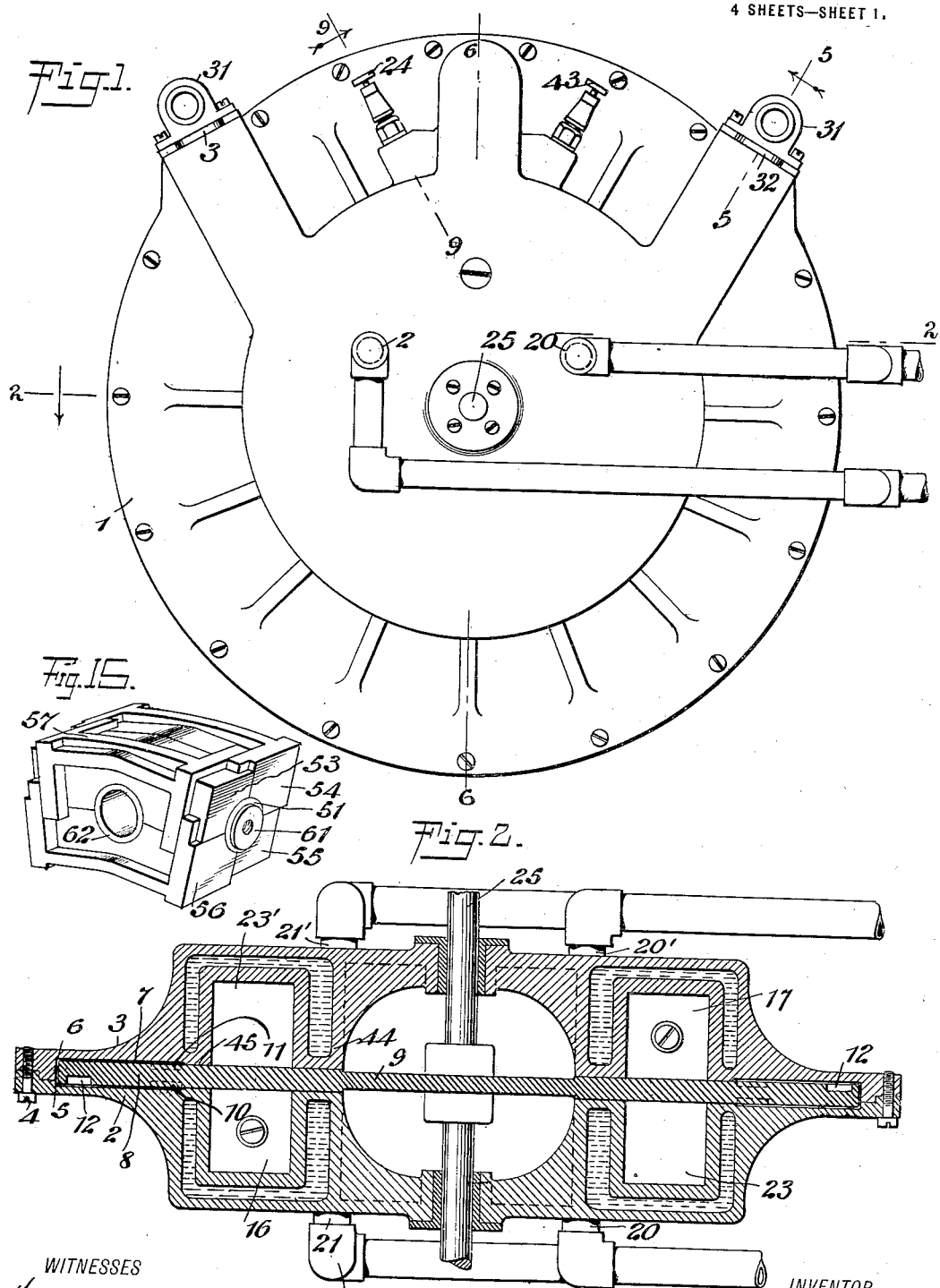

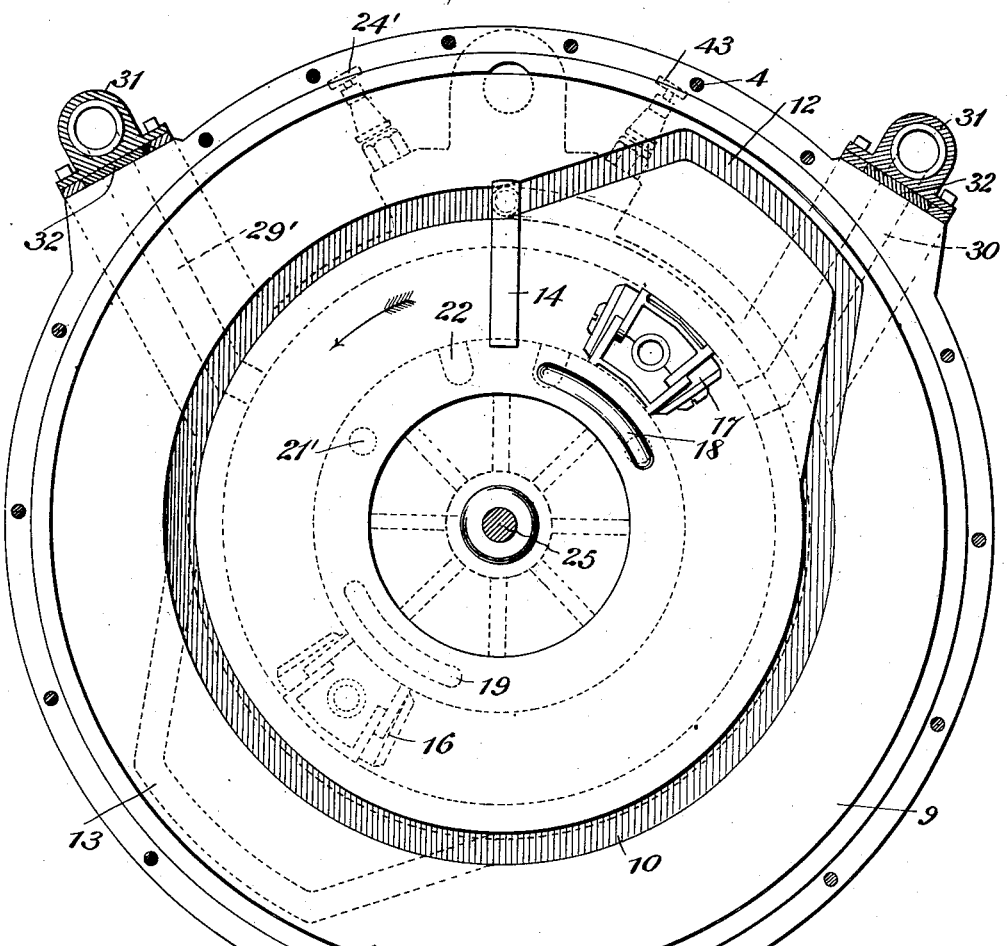

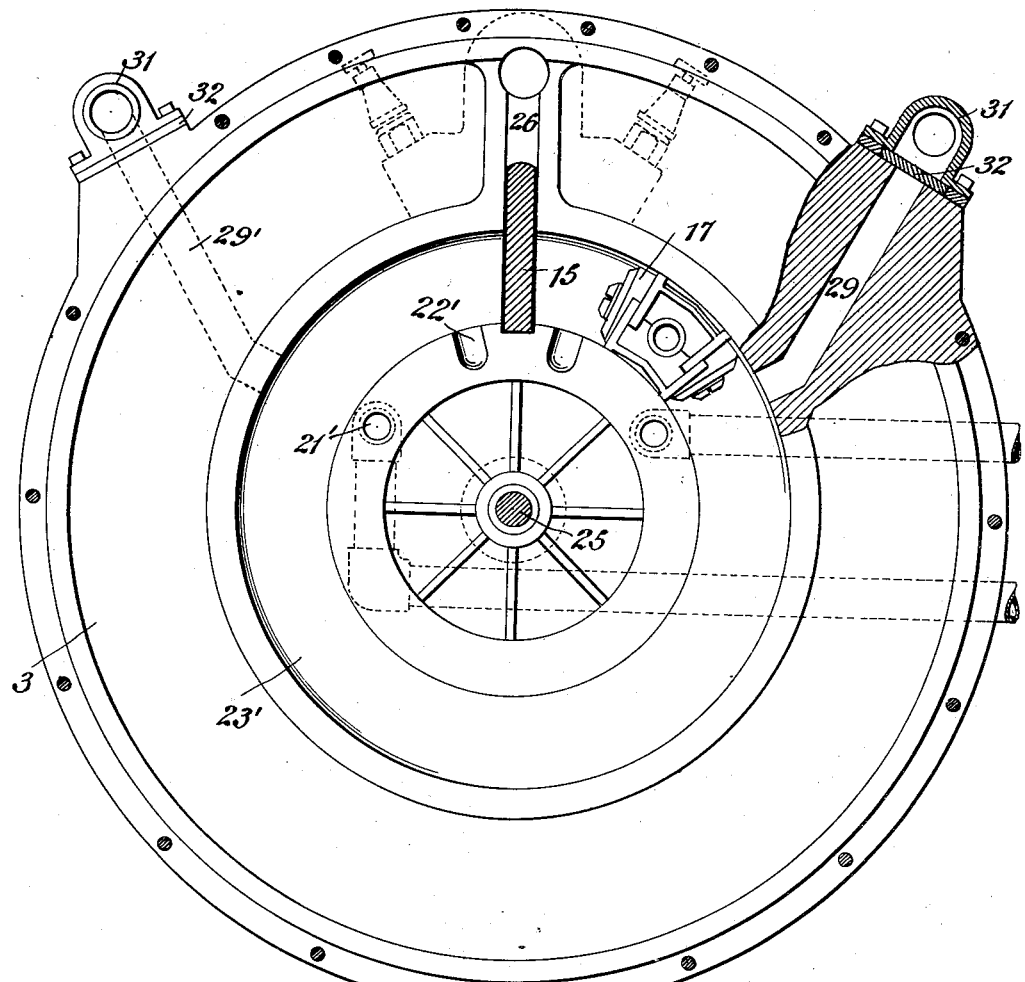
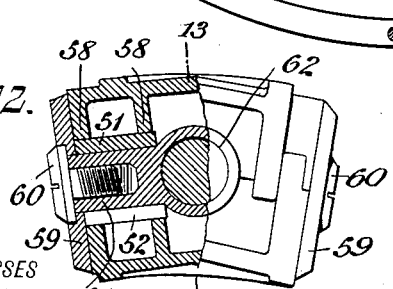
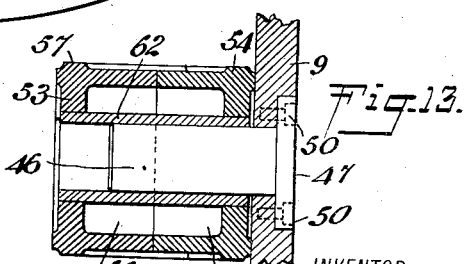
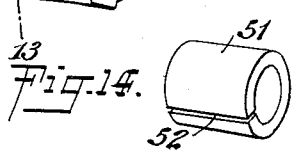

UNITED STATES PATENT OFFICE.

HENRY WILLIAM RHOADS, OF EAST RUTHERFORD, NEW JERSEY.

ROTARY EXPLOSION-ENGINE.

1,186,332.      Specification of Letters Patent.      Patented June 6, 1916.

Application filed July 2, 1914. Serial No. 848,643.

*To all whom it may concern:*

Be it known that I, HENRY W. RHOADS, a citizen of the United States, and a resident of East Rutherford, in the county of Bergen and State of New Jersey, have invented a new and Improved Rotary Explosion-Engine, of which the following is a full, clear, and exact description.

This invention relates to internal combustion engines and particularly to what are known as rotary engines, and has for an object to provide an improved construction which will produce high efficiency and a maximum power for a given quantity of fuel.

A further object of the invention is to provide a rotary engine which may be used as an internal combustion engine, a pump, a steam engine, or other variety of power motor which uses expansion gases.

A further object of the invention is to provide an engine with a pair of circular chambers and a rotating plate arranged therebetween, which plate carries the pistons for the cylinders from which the power is taken when the machine is used as a motor and to which the power is supplied when the machine is used as a pump.

A still further object in view is to provide an internal combustion engine in which the pistons may be reversed by a reversal of the valves in the inlets and exhaust passages and a simultaneous reversing of the sparking devices.

In carrying out the objects of the invention a body is provided which is divided into halves. These halves are formed in duplicate and recesses are provided therebetween which accommodate a disk. Each half of the casing is provided with an annular chamber preferably square in cross section for receiving pistons connected with the dividing wall or disk. Explosive mixture under pressure is fed into cylinders through suitable pipes, said mixture being admitted between a movable abutment and the pistons previous to the time of explosion. In arranging the sparking device and the exhaust, it is designed to place the exhaust as far from the sparking devices as possible; for instance, at approximately 330 degrees. This allows a large space for the power gases to expand and thereby utilize not only the direct pressure but the expansion of said gases.

In the accompanying drawings—Figure 1 is a side view of an embodiment of the invention; Fig. 2 is a section through Fig. 1 on the line 2—2; Fig. 3 is a longitudinal vertical section through the structure shown in Fig. 1, the same being on a slightly larger scale; Fig. 4 is a top plan view of the structure shown in Fig. 1, but on a reduced scale; Fig. 5 is an enlarged fragmentary sectional view through Fig. 1 approximately on the line 5—5; Fig. 6 is a section through Fig. 1 approximately on the line 6—6; Fig. 7 is an enlarged detail fragmentary sectional view, through the structure shown in Fig. 1, for disclosing the abutment and how the same coacts with an operating groove; Fig. 8 is a view similar to Fig. 7 but showing the movable wall or disk carrying the groove in advanced position; Fig. 9 is a fragmentary sectional view through Fig. 1 approximately on the line 9—9; Fig. 10 is a fragmentary sectional view through Fig. 8 approximately on the line 10—10; Fig. 11 is a view similar to Fig. 3 but with the plate removed; Fig. 12 is an enlarged view of one of the pistons, part of the same being shown in section to better disclose the construction; Fig. 13 is a sectional view through Fig. 12 approximately on the line 13—13, a piece of the rotary disk being shown associated therewith; Fig. 14 is a detail perspective view of one of the expanding sleeves in the piston shown in Fig. 12; and Fig. 15 is a perspective view of the box or expanding parts of the piston shown in Fig. 12.

Referring to the accompanying drawings by numeral, 1 indicates a casing which is divided into parts 2 and 3 as shown in Fig. 2, these parts being held together by suitable screws or bolts 4. The parts 2 and 3 are provided with recesses 5 and 6 which provide an annular chamber 7 in which the upper part 8 of the movable wall or disk 9 operates. Grooves 10 and 11 are provided in the movable wall or disk 9, which grooves merge into camways 12 and 13 respectively. As shown in Fig. 3, the camways 12 and 13 cause the abutments 14 and 15 to be raised alternately, and at 180 degrees apart. It is also to be noted that the pistons 16 and 17 are connected with the movable wall or disk 9 opposite the center of the camways 12 and 13, whereby the abutments are raised immediately before the passage of the pistons and are lowered immediately after the passage of the pistons. The movable wall or disk 9 is provided with short passageways or grooves 18 and 19 respectively. These grooves control the inlet of the expansive fuel or other motive fluid used in the engine. The supply of motive fluid is connected up with apertures 20 and 21, the aperture 20 being in part of section 3 of the casing and the aperture 21 being in part of section 2 of the casing, whereby the ways or grooves 18 and 19 which are on opposite sides of the disk 9 will register with the respective apertures 20 and 21. When the aperture or inlet 21 is registering with the groove 18, combustible mixture will pass from the inlet 21 through the passageway 18 and thence through a suitable notch 22 into a chamber 23. At the time that the passageway 18 registers with the inlet 21, the piston 16 will have moved substantially to the position shown in Fig. 8. This will cause the motive fluid to pass in back of the piston and in front of the abutment 14 until the disk 9 has moved the passageway 18 out of registry with the aperture 21, and the sparking device 24 ignites the motive fluid and thereby causes the motive fluid to give the piston 16 a forward impulse. After the disk or movable wall 9 has moved for half a revolution, the piston 17 moves from the position shown in Fig. 11 past the abutment 15 and in this position the passageway 19 will register with an inlet 21′ and with a notch 22′ so that combustible mixture may enter in the space between the piston and the abutment. As soon as the piston and plate 9 have moved sufficiently to cause the passageway 19 to move out of registry with the inlet 21′, the sparking device 24 will ignite the explosive mixture and thereby give a forward impulse to the piston 16, which impulse is transmitted to the plate 9 and thence to the power shaft 25. It will be noted that the explosive mixture is forced into the engine under any desired pressure, which pressure may be varied according to circumstances.

In forming the parts 2 and 3 of the casing, ways 26 are provided for the abutments 14 and 15 so as to guide the same in an up and down movement. In order that the cam grooves 12 and 13 may properly operate these abutments, each abutment is provided with a pin 27, which pin preferably carries an antifriction roller 28 at the outer end. This antifriction roller extends into the grooves 12 and 13 and also operates in the grooves 10 and 11. This provides a smooth easy action and one which absolutely insures the raising of the abutment previous to the passage of the piston.

In order that the chambers 23 and 23′ may properly exhaust, passageways 29 and 30 are arranged on each side of the abutments. See Fig. 5. These passageways open into an exhaust discharge member 31. A valve 32 is provided with apertures 33 and 34, whereby the passages 29 and 30 may be opened and closed whenever desired. The member 31 has pipes 35 and 36 connected therewith for directing the exhaust to any desired point. The outer end of the valve 32 is provided with an aperture 37 for receiving a pin whereby a lever 38 (Fig. 4) may be connected therewith. It is to be noted that the lever 38 is connected with the slide valve 32 at the opposite side of the engine and pivotally connected at 39 to the casing, so that when one slide valve is open, as shown in Fig. 5, the other is closed. When the engine is reversed, all that is necessary to do is to reverse the exhaust valves just described and to turn off the supply fuel by operating the valve 40 and turn on the supply fuel by operating the valve 41. The valve 40 allows fuel to pass to the inlets 20 and 21 while the valve 41 allows fuel to pass through suitable pipes and thence to the inlets 20 and 20′. The sparking devices also should be reversed so that the spark plugs 42 and 43 may operate the spark plugs 24 and 24′. Any suitable mechanism may be provided for causing a reversal of the sparking either independently or in conjunction with a reversing of the exhaust passageways. When the engine is reversed, the action is similar to that heretofore described except that it takes place on the opposite side of the abutments.

In connection with the disk or movable wall 9 it is observed that the casing at point 45 is comparatively narrow so that the friction between the casing and the disk 9 will be reduced to a minimum and at the point 45 the contacting portion of the plate and casing is reduced to a minimum by reason of the chamber 7. This allows a tight bearing surface and yet permits the disk to rotate without undue friction. It is evident that packing rings and other suitable attachments may be provided without departing from the spirit of the invention.

Connected with the disk 9 are pistons 16 and 17 which pistons are identical in construction. The detail structure of these pistons is shown in Figs. 12 to 15 inclusive to which reference is now made. In order to hold the piston in place a journal member or pin 46 is provided which has its head 47 countersunk in the disk 9 and held in place by suitable screws 50. The cross section through the piston, as shown in Fig. 13, is square so as to properly fit the chambers 23 and 23′ which are square in cross section. If other shaped chambers were provided, the pistons would have to be constructed to conform thereto, but the square chamber is preferable as the same may be more easily machined out during the manufacture of the device. In pistons of all kinds it is necessary to provide means for causing the pistons to have a tight joint or fitting between the piston and the cylinder or chamber. In the ordinarily constructed piston, piston rings are used, but in the piston under consideration these rings are eliminated and the piston is made into several parts, which parts are pressed outwardly by rings 51 which are divided along the line 52 and normally spring outwardly or remain open. This ring or sleeve is compressed when the piston is placed in the chamber and consequently the parts of the piston are resiliently urged against the walls of the cylinder. Each of the pistons is formed into sections 53, 54, 55 and 56, each of which is provided with ridges or raised portions 57 having overlapping ends as clearly shown in Fig. 12, whereby a continuous surface is provided so as to allow the sections to separate to a greater or less extent in order to properly fit the chamber. Each of the sections is provided with walls 58 designed to bear against respective sleeves 51. Each end of the piston is provided with a retaining plate 59 held in place by retaining screws 60. The retaining screws 60 are threaded into sleeves 61, which sleeves have a tubular center 62 into which the pin 46 projects as shown in Fig. 13. As shown in this figure, the ridges or raised portions 57 act against the plate or disk 9 and also against the three side walls of the chamber so that none of the gases or other explosive mixture can pass from one side of the piston to the other. These raised portions 57 are especially valuable when passing the grooves or notches provided for guiding the abutments, as they guide the piston as it passes from one side of the abutment to the other.

In operation the combustible mixture as, for instance, air and gas or vaporized gasolene, is mixed and compressed in a suitable tank by any desired means, and then the compressed mixture is allowed to pass through suitable pipes to the valves 40 and 41. When the valve 40 is opened, the explosive mixture will pass into inlets 21 and 21' after which it is exploded as heretofore described, and the pistons urged forward in the direction of arrows shown in Fig. 7. As the piston moves around and past the exhaust opening 29, the burned products of combustion in the chamber are allowed to escape and, in fact, are forced through said discharge passageway 29 by the next revolution of the piston. When it is desired to reverse the rotation of the machine, the valve 40 is closed and the valve 41 opened, and the lever 38 is moved so as to close the ports 29 and 30 and open the ports 29.' This will cause the gas to be admitted into the chamber between the piston and abutment when the same are in the position shown in Fig. 3, whereby the piston will be forced in the reverse direction to the arrow shown in Fig. 3. It is evident that compressed air, steam or other expansive gases may be admitted into the chambers as well as an explosive mixture for operating the pistons. Where air or steam is admitted it is preferable to elongate the inlet ports 21 and 21' and also the ports 20 and 20', so that the air or steam will be admitted for greater length of time in the place of explosive mixture. It will be evident that other slight changes and variations may be provided without departing from the spirit of the invention as, for instance, power could be applied to the shaft 25 and the pistons 16 and 17 caused to act as compressing members for compressing air or for pumping any desired fluid.

Having thus described my invention, I claim as new and desire to secure by Letters Patent:—

1. In an explosive engine of the character described, a casing, an annular chamber arranged in said casing, a movable wall arranged adjacent said casing, a piston arranged in said chamber, means for connecting said piston with said movable wall, an abutment arranged in said chamber, said movable wall being provided with an annular groove extending partially around the wall and then merging into a cam-shaped groove, means extending from said abutment and projecting into said groove so as to be operated by the cam-shaped portion thereof for causing said abutment to move out of the chamber as the piston passes the abutment, means for directing an explosive mixture to said chamber adjacent said abutment, and means for igniting said explosive mixture.

2. In an explosion engine of the character described, a casing provided with a plurality of annular chambers, a rotating wall arranged between said chambers, the diameter of said rotating wall being greater than the diameter of said chambers, said rotating wall in its peripheral section containing lifting camways, a sliding abutment arranged in each of said chambers and movable toward and from the center of said casing, means extending from each of said abutments and engaging said camways whereby, when said rotating wall is operated, the abutments will be successively raised, a piston arranged in each of said chambers, means for securing said pistons to said rotating wall opposite said camways, means for directing explosive matter into each of said chambers, and sparking devices for igniting said explosive matter.

3. In an explosion engine of the character described, a casing provided with a pair of annular chambers, a rotating wall arranged between said chambers, said rotating wall being provided with substantially annular grooves on each side merging into camways at 180 degrees apart, said grooves and camways being on opposite sides of said wall, a piston for each of said chambers, means for securing said pistons to said rotating wall opposite the respective camways, a pair of abutments arranged in line and projecting into said chambers, means extending from said abutments and fitting into said respective grooves whereby the abutments are raised by said camways successively and at 180 degrees apart, means for supplying an explosive mixture to each of said chambers, and sparking devices for igniting said explosive mixture.

4. In an explosion engine of the character described, a casing provided with a pair of annular chambers, a rotating wall arranged between said chambers, a piston for each of said cylinders connected to said rotating wall, a pair of abutments arranged in said chambers, a plurality of means for supplying explosive mixture to either side of said abutments, a pair of opposite passageways on each side of said abutments, means for closing one pair of said opposite passageways while the other is open, means for closing one of said supply passageways while the other remains open, and a plurality of pairs of sparking devices, one pair being arranged on each side of said abutments whereby said pistons may be caused to rotate in either direction according to the adjustment of the various parts.

5. In an explosive engine of the character described, a casing provided with a pair of annular chambers, a disk arranged between said chambers, said disk defining a movable wall, said movable wall extending radially beyond said chambers, said casing being provided with an annular passageway radially beyond said chambers, said wall being formed with an annular groove on each side merging into cam sections, an abutment for each of said chambers, each of said abutments being formed with projections fitting into said grooves whereby the cam sections of the grooves will move the abutments in and out of said chambers at certain times, a piston secured to said wall in each of said chambers, said pistons being adapted to pass the abutments immediately after said cam surfaces have moved the same out of said chambers, means for directing explosive mixture between said abutments and said pistons, and means for igniting said explosive mixture.

6. In an explosive engine of the character described, a casing, an annular chamber arranged in said casing, a movable wall arranged adjacent said casing, a piston arranged in said chamber, means for connecting said piston with said movable wall, an abutment arranged in said chamber, said movable wall being provided with an annular groove extending partially around the wall and then merging into a pair of cam-shaped grooves connected by a short arc-shaped groove, means extending from said abutment and projecting into said groove so as to be operated by the cam-shaped grooves thereof for causing said abutment to be moved into said chamber and out of said chamber in timed relationship to the movement of the piston, means for directing an explosive mixture to said chamber adjacent said abutment, and means for igniting said explosive mixture.

In testimony whereof I have signed my name to this specification in the presence of two subscribing witnesses.

HENRY WILLIAM RHOADS.

Witnesses:
 EDWARD HARRISON UNKLES,
 W. GRAFTON BATEMAN.